Oct. 27, 1964 R. E. WALLIN ETAL 3,154,349

MATERIAL HANDLING APPARATUS

Filed July 6, 1962

INVENTORS
ROBERT E. WALLIN
HAROLD L. PRITT

By Joseph A. Brown
ATTORNEY

United States Patent Office 3,154,349
Patented Oct. 27, 1964

3,154,349
MATERIAL HANDLING APPARATUS
Robert E. Wallin, New Holland, Pa., and Harold L. Pritt, La Vale, Md., assignors to Sperry Rand Corporation, New Holland, Pa., a corporation of Delaware
Filed July 6, 1962, Ser. No. 208,033
3 Claims. (Cl. 302—37)

This invention relates generally to material handling apparatus and more particularly to a forage blower adapted to elevate crop material to a silo or other storage structure.

One type of forage blower has an upright housing which is generally circular about a horizontal axis. The housing has an upwardly extending tangential discharge spout and vertically extending walls which support a fan unit within the housing. One vertical wall has an infeed opening adjacent a lower portion thereof and the material to be elevated is conveyed through the opening by a horizontally extending auger in register with the opening and operable in a trough at the bottom of a hopper. Hopper walls guide material into the trough. The material may be discharged from a self unloading wagon or from some other source and into the hopper.

With forage blowers of the type described, if the material to be handled is relatively heavy and wet, the delivery of material to the infeed auger should be controlled. Over feeding the hopper may cause plugging of the blower. If the material is dry and light, then a heavy infeed is desirable to resist blowback of material caused by air traveling outwardly from the infeed opening.

One object of this invention is to provide control means in a forage blower of the character described which is adapted to be used for regulating the volume of material delivered to the blower and for regulating the blowback of material from the infeed opening.

Another object of this invention is to provide a forage blower having blowback and volume control means which is simply constructed and adjustable to take into consideration the particular characteristics of the material being handled.

A further object of this invention is to provide a forage blower having a control structure of the character described which is simple to manufacture and operate.

Other objects of this invention will be apparent hereinafter from the specification and from the recital in the appended claims.

Figure 1:
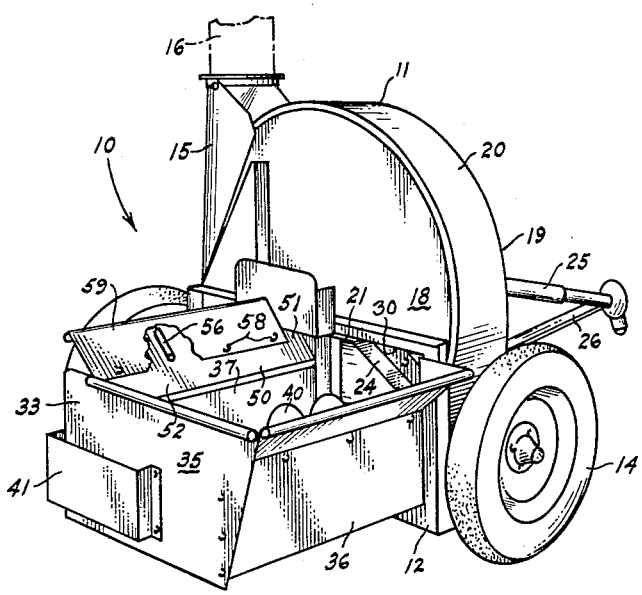
FIG. 1 is a perspective view of a forage blower constructed according to this invention.

Referring now to the drawing by numerals of reference, and particularly to FIG. 1, 10 denotes a forage blower comprising an upright housing 11 carried on a frame structure 12 supported on ground wheels 14. The housing 11 is generally cylindrical about a horizontal axis, having an upwardly extending tangential spout 15 through which material is adapted to be discharged to a vertical pipe 16. The blower housing has relatively spaced, parallel vertically extending walls 18 and 19 connected by peripheral wall portion 20.

Figure 2:
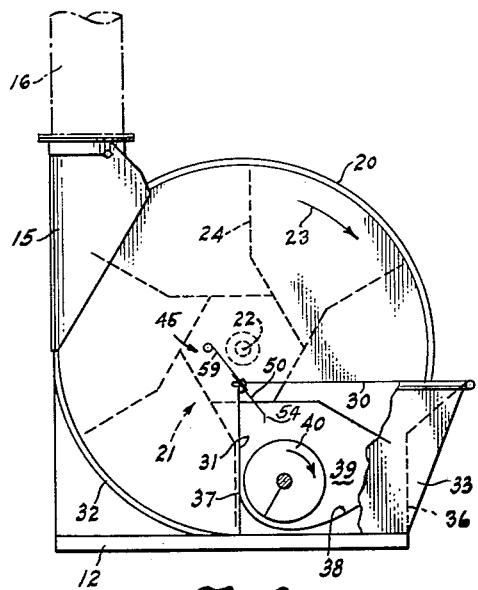
FIG. 2 is a front view of FIG. 1 and showing the volume and blowback control means of this invention.

Within blower housing 11 is a fan 21 having a shaft 22 journalled in the blower housing vertical walls for rotation in a clockwise direction when viewed as shown in FIG. 2 and as shown by the arrow 23. The fan has a plurality of angularly spaced fan blades 24 operable to sweep close to peripheral wall 20 of the blower housing and about the axis of the shaft 22 which is coaxial with the axis of the blower housing. Power is supplied to fan 21 through a conventional power-take-off assembly 25 (FIG. 1) which extends outwardly from wall 19. A hitch 26 is provided to connect the blower to a tractor so that the structure may be transported to any desired location, the power-take-off connection 25 being adapted to be affixed to the power output shaft of the tractor.

Wall 18 of housing 11 has an infeed opening 30 located beneath the axis of the housing and in the lower right hand portion of the wall when the blower is viewed as shown in FIG. 2. Opening 30 has a vertical edge 31 substantially angularly spaced from the discharge spout 15. Material is adapted to be fed into the blower housing through the opening 30 where it is gathered by the fan blades 24 and thrown and blown upwardly through pipe 16. The blades 24 travel downwardly across opening 30 and then sweep upwardly along the arcuate section 32 of housing wall 20.

Connected to wall 18 is a hopper 35 comprising a pair of vertical side walls 36 and 37 and a bottom wall 38 all of which extend outwardly from side wall 18 and form a trough 39 in register with opening 30. A vertical end wall 33 is fastened to the side walls and bottom to complete the hopper structure so that forage and other material to be handled may be deposited therein. Operable in trough 39 and rotatable about an axis which is parallel to the axis of shaft 22 of fan 21 is an auger 40 journalled in hopper wall 33 and driven by a connection not shown to assembly 25 and a portion of which is enclosed in shield structure 41. The end of auger 40 adjacent blower housing 11 terminates at a point which will provide the necessary clearance between the fan blades 24 and the auger flights.

Forage material deposited in hopper 35 usually comes from a self unloading wagon or the like. Such wagons differ considerably in discharge rates and therefore it is desirable to have a blower structure which is adaptable to various infeed rates. If the material is wet and heavy and if it is deposited in hopper 35 at a rapid rate, some plugging of the blower may result. If the material being handled is light, dry and fluffy, and the discharge rate to hopper 35 is slow, then blowback is a problem. To adjust to the conditions presented, infeed and blowback control means 45 is provided comprising a baffle 50 mounted at an incline on side wall 37 and extending downwardly and inwardly of the hopper 35. Baffle 50 is rectangular in configuration having an end 51 adjacent the blower housing and an end 52 remote therefrom. The baffle 50 extends parallel to auger 40, having a longitudinal, downturned, marginal flange 54 providing a linear edge 55 adapted to be located and related relative to the auger. Baffle 50 has elongated slots 56 which extend transverse to the extension of auger 40 and through which carriage bolts 58 extend to connect the baffle to a plate 59 of hopper 35 and connected to the blower structure generally. The plate 59 is inclined at an angle the same as the incline of baffle 50.

When viewed as shown in FIG. 2, forage material is adapted to be deposited in hopper 35 over the wall 36 and toward the wall 37. The plate 59 helps to prevent material from being dumped over the side 37 of the hopper. The material falls by gravity to the trough 39 where it is conveyed by auger 40 through the opening 30 and into blower housing 11. The fan 21 then operates to discharge the delivered material through spout 15 and pipe 16.

Figure 3:
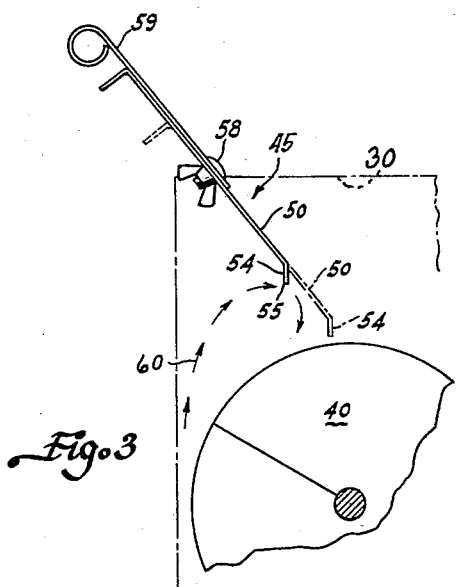
FIG. 3 is an enlarged fragmentary view showing the control means in one position of adjustment in solid lines and in another position in dotted lines.

When the carriage bolts 58 are loosened, baffle 50 may be adjusted toward or away from the periphery of auger 40, as shown in FIG. 3. Since the baffle extends on an incline, the cross sectional opening into the hopper is changed when the baffle is adjusted. Therefore, the capacity of hopper 35 is changed when the baffle is moved. Further, since the baffle is located adjacent and extends from blower opening 30, the blowback of air from the housing 11 is restricted. The closer baffle 50 is adjusted to auger 40, the lesser the blowback problem. Escaping air adjacent the housing 11 is caused to travel in the direction indicated by the arrows 60 in FIG. 3. It is the left portion (FIG. 2) of opening 30 where the blowback tends to occur because the fan blades 24 sweep in that direction, and it is in this area that the control baffle 50 is most effective. The air travel is directed toward hopper wall 37 by the flange 54. In the absence of such flange, air would move over the auger and toward the portion of bottom wall 38 adjacent wall 36.

Further, when baffle 50 is adjusted to the dotted position shown in FIG. 3 the flange 54 serves as a scraper for auger 40. Any chunks of material projecting beyond the periphery of the auger or clinging thereto are knocked off for conveyance along side wall 37 and through opening 30.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Forage handling apparatus comprising an upright housing generally circular about a horizontal axis and provided with an upwardly extending tangential discharge spout at one side of the housing, said housing having spaced apart vertically extending front and rear walls, said front wall having an infeed opening adjacent a lower portion only of the housing and substantially angularly spaced from said discharge spout, a generally cylindrical peripheral wall connecting said front and rear walls, a fan journalled in said housing and rotatable at high speed about a horizontal axis common with the housing axis, said fan having blades which move downwardly past said infeed opening and then sweep upwardly along said peripheral wall and discharge material upwardly through said spout, a hopper having a pair of spaced side walls and a bottom wall extending away from said blower housing front wall and forming a horizontal trough in register with said infeed opening, one of said side walls being located closer to said spout than the other side wall, an end wall on said hopper spaced from said blower housing, an auger within said trough and rotatable in the same direction as said fan about an axis generally parallel to the fan axis to convey material deposited in the hopper through said infeed opening, an elongated baffle mounted on said one hopper side wall above said auger and extending parallel to the auger from an end adjacent the blower housing to an end remote therefrom, said baffle being inclined downwardly from said one side wall and into said hopper and having a lower inner edge spaced from an upper portion of said auger and substantially removed from the other of the hopper side walls to define an opening to the auger, and means connecting said baffle to said hopper one wall for adjustment toward and away from said auger to vary the space between said inner edge and the auger, said baffle being substantially spaced from said other side wall regardless of its position of adjustment and operative to control the downward flow of material in said hopper to said auger and to restrict blowback of material adjacent said infeed opening.

2. Forage handling apparatus as recited in claim 1 wherein said baffle comprises a plate having a flange along said lower inner edge, said flange extending downwardly from said plate and toward the periphery of said auger.

3. Forage handling apparatus as recited in claim 1 wherein said hopper side walls are inclined toward each other and said end wall is vertical, and said baffle extends below the upper end of the housing infeed opening regardless of the position of adjustment of the baffle.

References Cited by the Examiner

UNITED STATES PATENTS

| | | | |
|---|---|---|---|
| 1,189,663 | 7/16 | Carson | 302—37 |
| 1,304,973 | 5/19 | Heffelfinger | 302—50 |
| 2,421,418 | 6/47 | Grossman | 302—50 |
| 2,601,608 | 6/52 | Hansen | 302—50 |
| 2,639,949 | 5/53 | Zollars | 302—37 |

SAMUEL F. COLEMAN, *Acting Primary Examiner.*

ANDRES H. NIELSEN, ERNEST A. FALLER, JR.,
*Examiners.*